United States Patent
Ventura

(10) Patent No.: US 6,269,546 B1
(45) Date of Patent: Aug. 7, 2001

(54) HEAD FOR THE LINEAR DIMENSION CHECKING OF MECHANICAL PIECES

(75) Inventor: Luciano Ventura, Zola Predosa (IT)

(73) Assignee: Marposs Societa per Azioni, Bentivoglio (BO) (IT)

( * ) Notice: Subject to any disclaimer, the term of this patent is extended or adjusted under 35 U.S.C. 154(b) by 0 days.

(21) Appl. No.: 09/269,537

(22) PCT Filed: Oct. 30, 1997

(86) PCT No.: PCT/EP97/08031

§ 371 Date: Mar. 30, 1999

§ 102(e) Date: Mar. 30, 1999

(87) PCT Pub. No.: WO98/20297

PCT Pub. Date: May 14, 1998

(30) Foreign Application Priority Data

Nov. 7, 1996 (IT) ............................................. BO96A0563

(51) Int. Cl.[7] ................. G01B 5/00; G01B 3/00; G01D 21/00
(52) U.S. Cl. .................. 33/645; 33/556; 33/559; 33/710; 33/832
(58) Field of Search ............................ 33/706, 707, 708, 33/710, 711, 542, 546, 549, 550, 783, 832, 613, 645, 559, 556, 558, 561, 544, 544.2

(56) References Cited

U.S. PATENT DOCUMENTS

| | | | |
|---|---|---|---|
| 3,946,492 | 3/1976 | DuBose, Jr. | 33/169 |
| 4,098,001 * | 7/1978 | Watson | 33/559 |
| 4,306,455 * | 12/1981 | Selleri | 33/542 |
| 4,348,814 * | 9/1982 | Possati et al. | 33/542 |
| 4,377,911 * | 3/1983 | Iida et al. | 33/556 |
| 4,386,467 * | 6/1983 | Possati et al. | 33/542 |
| 4,409,737 | 10/1983 | Golinelli | 33/172 |
| 4,412,385 * | 11/1983 | Selleri | 33/542 |
| 4,417,400 * | 11/1983 | Dall'Aglio | 33/556 |
| 4,787,149 * | 11/1988 | Possati et al. | 33/542 |
| 5,072,524 * | 12/1991 | Zanier et al. | 33/558 |
| 5,083,384 | 1/1992 | Possati et al. | 33/542 |
| 5,157,845 * | 10/1992 | Possati et al. | 33/542 |
| 5,174,039 * | 12/1992 | Murai | 33/556 |
| 5,647,137 * | 7/1997 | McMurtry et al. | 33/559 |
| 5,664,336 * | 9/1997 | Zanier et al. | 33/706 |
| 5,746,003 * | 5/1998 | Baruchello | 33/542 |
| 5,870,834 * | 2/1999 | Sheldon | 33/559 |
| 5,887,356 * | 3/1999 | Sheldon | 33/559 |
| 6,021,579 * | 2/2000 | Schimmels et al. | 33/645 |

FOREIGN PATENT DOCUMENTS 1 407 621   9/1975 (GB).

OTHER PUBLICATIONS

Patent Abstracts of Japan, Kokai No. 62–022002, Jan. 30, 1987.
Patent Abstracts of Japan, Kokai No. 56–097810, Aug. 6, 1981.
Patent Abstracts of Japan, Kokai No. 60–161508, Aug. 23, 1985.

* cited by examiner

*Primary Examiner*—Diego Gutierrez
*Assistant Examiner*—Yaritza Guadalupe
(74) *Attorney, Agent, or Firm*—Dickstein Shapiro Morin & Oshinsky LLP

(57) ABSTRACT

A gauging or measuring head for the linear dimension checking of mechanical pieces, including a casing (1), an arm (49) carrying a feeler (67) for contacting a piece to be checked, a fulcrum (74), coupled to the casing (1) and the arm (49), for enabling displacements of the arm (49) with respect to the casing (1), a return spring (95) for keeping the feeler (67) in contact with the piece during the checking, a device (98, 100) for retracting the arm (49) and a position transducer providing signals depending on the position of the arm (49) with respect to the casing (1). The fulcrum is made of a deformable element (74) including two coupling blocks (81, 83) and three laminae (75, 77, 79) permanently secured to the blocks (81, 83), and substantially arranged in two different planes of a sheaf of planes.

36 Claims, 7 Drawing Sheets

HEAD FOR THE LINEAR DIMENSION CHECKING OF MECHANICAL PIECES

TECHNICAL FIELD

The present invention relates to a head for the linear dimension checking of mechanical pieces, including a support element that defines a longitudinal geometrical axis, a movable armset with an arm, movable with respect to the support element, and a feeler coupled to the arm, a fulcrum, coupled to the arm and the support element, for defining a rotation axis and enabling limited rotational displacements of the arm about the rotation axis with respect to the support element, and a transducer, coupled to the arm and the support element, for providing signals depending on the position of the arm with respect to the support element.

The invention further relates to a head for the linear dimension checking of mechanical pieces, including a support element that defines a longitudinal geometrical axis, a movable armset with an arm, movable with respect to the support element, and a feeler coupled to the arm, a fulcrum, coupled to the arm and the support element, for enabling limited rotational displacements of the arm with respect to the support element, a retraction device coupled to the support element and adapted to cooperate with the movable arm for bringing the arm to a definite inoperative position, and a transducer, coupled to the arm and the support element, for providing signals depending on the position of the arm with respect to the support element. The invention refers also to a process for manufacturing a fulcrum to be utilized in a head for the dimension checking.

BACKGROUND ART

There are known many types of gauging or measuring heads for the inspection of mechanical pieces in benches, transfer lines or in the so-called in-process applications in the course of the machining in machine tools.

In the known heads, the fulcrum, that couples the movable arm to a fixed support and must ensure particularly precise displacements of the arm, is achieved by either a material removal, i.e. a manufacturing process that involves delicate and costly mechanical machinings, or the arrangement, between the arm and the support, generally by removable couplings, of suitable devices for allowing arm displacements, i.e. an arrangement also requiring the utmost precision and, consequently, considerable time and costs.

In other heads, like the ones shown in U.S. Patent U.S. Pat. No. 3,946,492, an unfixed frame member carrying a feeler arm is movably coupled to a fixed base by means of a pair of spaced apart parallel leaf springs. The leaf springs allow substantially linear and parallel displacements of the feeler arm relative to the base, and render the heads unsuitable for checkings where there is shortage of room, such as in many in-process applications. Among other constructional features, the heads shown in the U.S. patent include retraction/release devices, e.g. with a bellows (FIG. 2) and a lever spring, the former being mechanically secured on one side to the fixed base and on the other side to such lever spring. The lever spring is, on its turn, pivotably connected to a fixed enclosure of the head, and cooperates with both a trasversal leg integral with the movable arm, and a biasing wire spring that also biases against such transversal leg. The dimensions and shapes of the lever and wire springs have to be precisely dimensioned so that in a non operative condition the unfixed member is retracted, whereas applying vacuum to the interior of the bellows, the action of the biasing wire spring prevails, and the unfixed member is released.

DISCLOSURE OF THE INVENTION

Object of the present invention is to provide a gauging or measuring head for the linear dimension checking of mechanical pieces that guarantees high standards of repeatability and accuracy, and is more compact, versatile and less expensive with respect to the known heads.

This and other objects are achieved by a head according to claims 1 and 23.

A further object of the invention is to obtain a precise fulcrum for gauging or measuring heads in a particularly economic, rapid and reliable way.

This and other objects are achieved by a manufacturing process according to claim 32.

BRIEF DESCRIPTION OF THE DRAWINGS

The invention is now described in more detail with reference to the enclosed sheets of drawings, given by way of non limiting example, wherein.

BEST MODE FOR CARRYING OUT THE INVENTION

Figure 1:
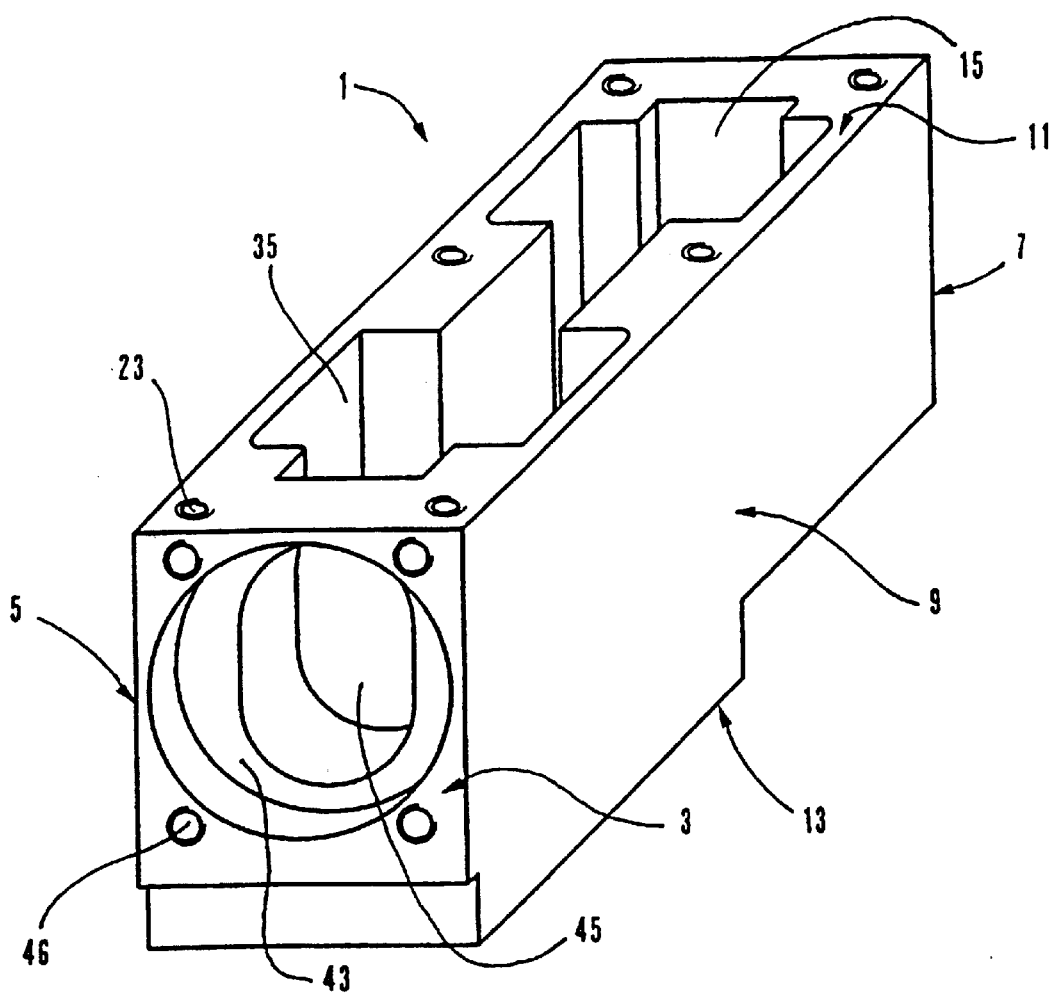
FIG. 1 is an axonometric view of the casing of a head according to the invention.
Figure 8:
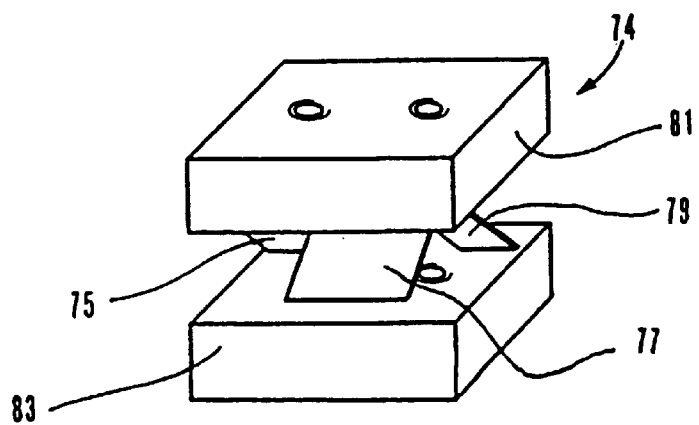
FIG. 8 is an enlarged scale axonometric view of an element of the head according to the invention.
Figure 2:
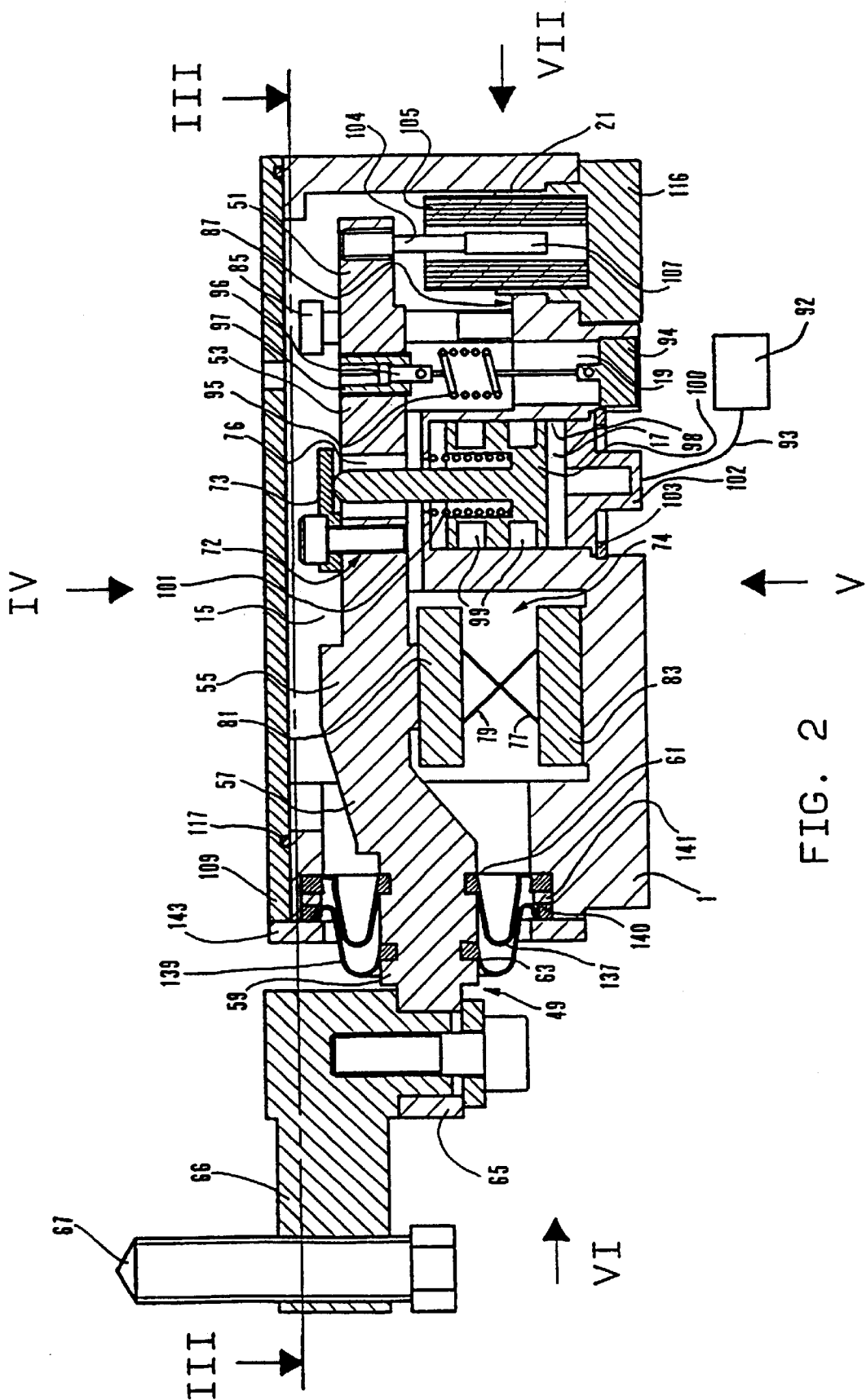
FIG. 2 is a longitudinal cross-sectional view of the head shown in FIG. 1.
Figure 3:
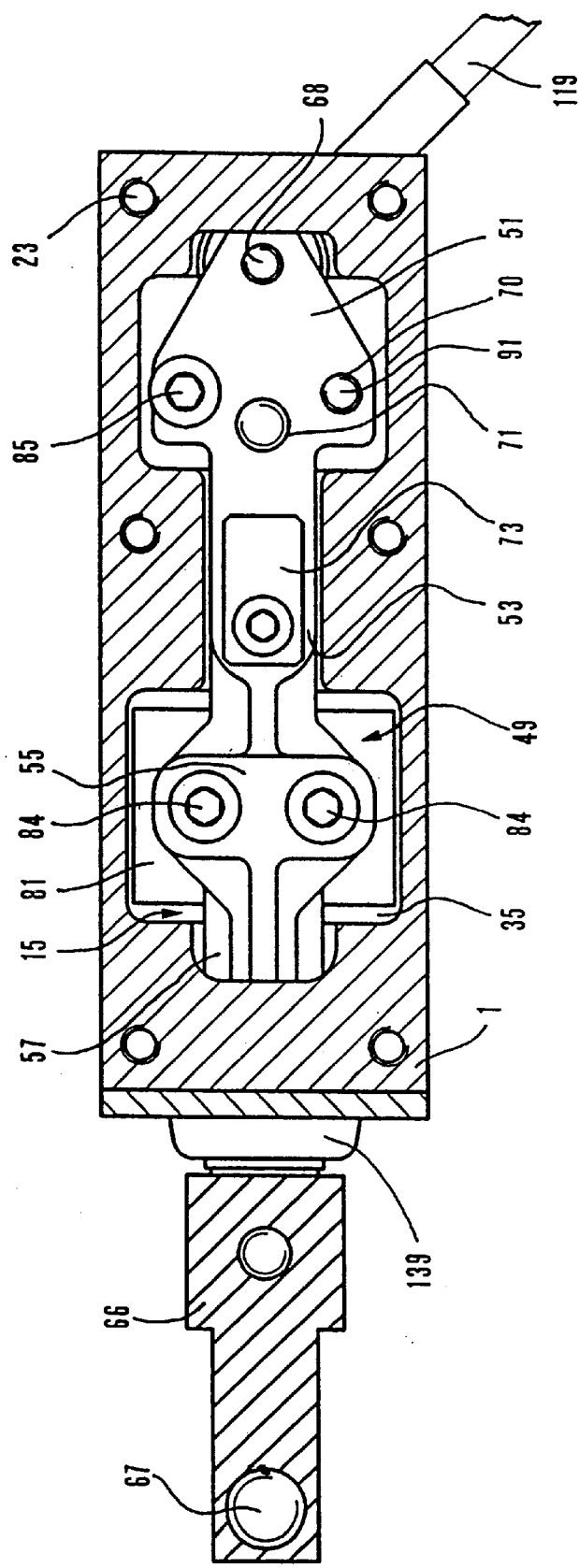
FIG. 3 is a cross-sectional view of the head of FIG. 2, taken along line III—III in the direction of the arrows.
Figure 4:
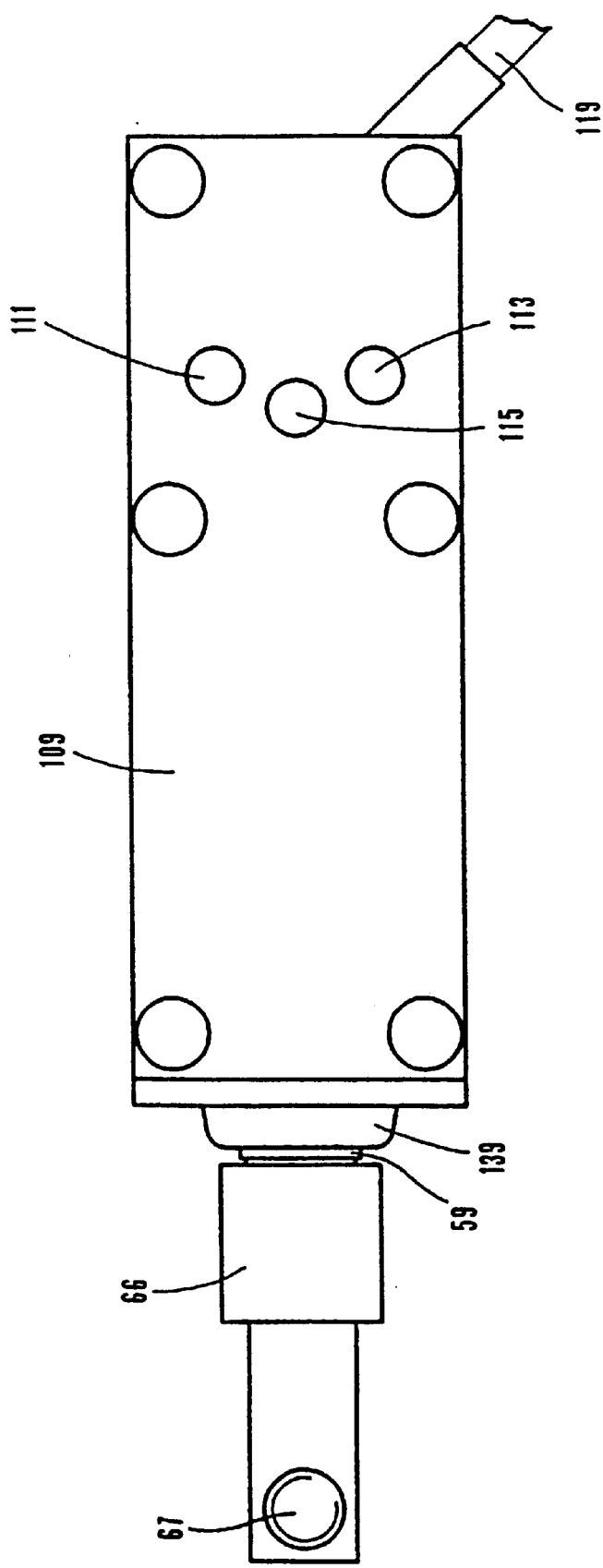
FIG. 4 is a plan view of the head of FIG. 2, when viewed in the direction of arrow IV.

The head shown in FIGS. 1–8, more particularly, a gauging head, includes a parallelepipedon shaped, steel casing 1, that forms a support element and defines a longitudinal geometrical axis. The casing 1 defines six faces 3, 5, 7, 9, 11 and 13.

The lateral faces 5 and 9 are reciprocally parallel and substantially plane, the rear face 7 is parallel to the front face 3 and the lower face 13 is parallel to the upper face 11.

The upper face 11 has six threaded holes 23 and an opening 35 for the passage to a recess 15.

The lower face 13 has three substantially cylindrical holes that define three seats 17, 19 and 21.

The front face 3 has four threaded holes 46 and a cylindrical-shaped recess 43 with a central -substantially oval-shaped- hole 45 for the passage to recess 15.

The rear face 7 has four threaded holes 47.

A movable armset comprises an arm 49 that is partially inserted in casing 1 and arranged in a direction substantially parallel to the longitudinal geometrical axis of casing 1. The arm 49 includes a first tapered-shaped, end portion 51, located inside casing 1, a second portion 53 with a reduced transversal cross-section, a third portion 55 with a substantially parallelepipedon shape, a fourth portion 57 with a reduced transversal cross-section, a fifth portion 59 with a substantially cylindrical shape and two grooves 61 and 63, located next to the front face 3 of casing 1, and a sixth end portion 65, at the exterior of casing 1, carrying a support 66 for a feeler 67.

The first portion 51 of arm 49 has three threaded holes 68, 70 and 71.

The second portion 53 of arm 49 has a threaded hole 72 and a slot 76.

A plate 73 is coupled to casing 1 by means of a screw screwed into hole 72.

A fulcrum 74 (also detailedly shown in enlarged scale in FIG. 8) for enabling limited rotational displacements of arm 49, comprises a deformable element consisting of three steel laminae 75, 77, and 79 permanently secured to two blocks 81 and 83 made, for example, of a zinc alloy. Die-casting is a process adopted for obtaining this permanent coupling between elements made of different materials, even though there can be foreseen other types of processes (for example, welding).

The die-casting process for permanently securing the laminae 75, 77 and 79 to blocks 81 and 83 consists in the insertion of the laminae 75, 77 and 79 in a die in which there is thereafter injected the melted material required for manufacturing the blocks 81 and 83. Thus, the laminae 75, 77 and 79 remain secured to this material once it has cooled down.

When the fulcrum is under rest conditions, the two blocks 81 and 83 are substantially parallel with respect to each other and the laminae 75, 77 and 79 form, for example, a 45 degree angle with blocks 81 and 83. The laminae 75 and 79 are substantially coplanar, whereas lamina 77 forms an angle of approximately 90 degrees with the other two laminae 75 and 79. In substance, the laminae 75, 79, on the one side, and 77, on the other, lie in two planes (e.g. two mutually perpendicular planes) of a sheaf of planes defined by a straight line that represents the axis of rotation of arm 49.

Figure 5:
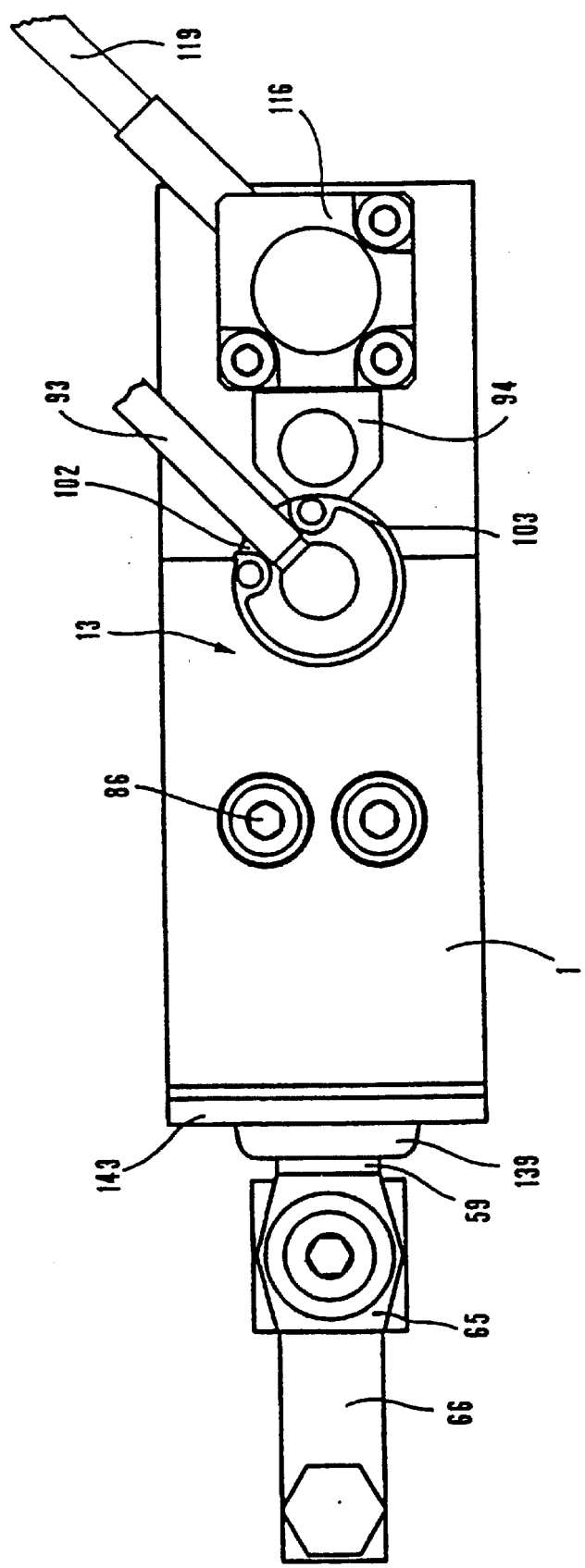
FIG. 5 is a plan view of the head of FIG. 2, when viewed in the direction of arrow V.
Figure 6:
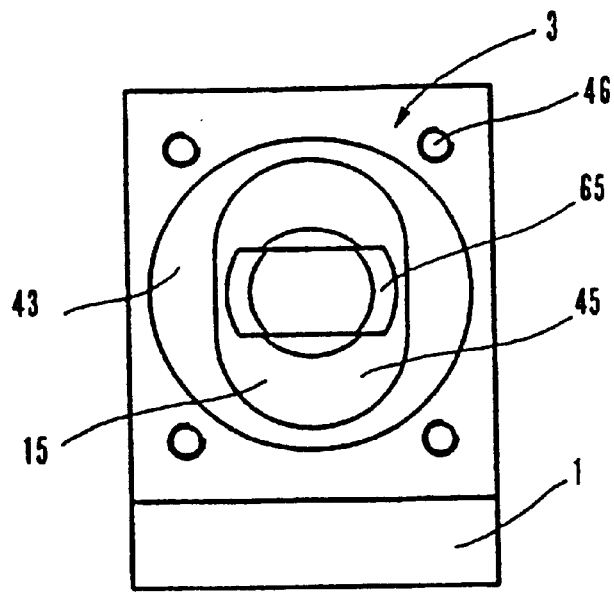
FIG. 6 is a front view of the head of FIG. 2, when viewed in the direction of arrow VI, wherein the covers 109 and 143, the gaskets 137 and 139, the spacer 141 and the feeler 67 with its associated support 66 have been removed.
Figure 7:
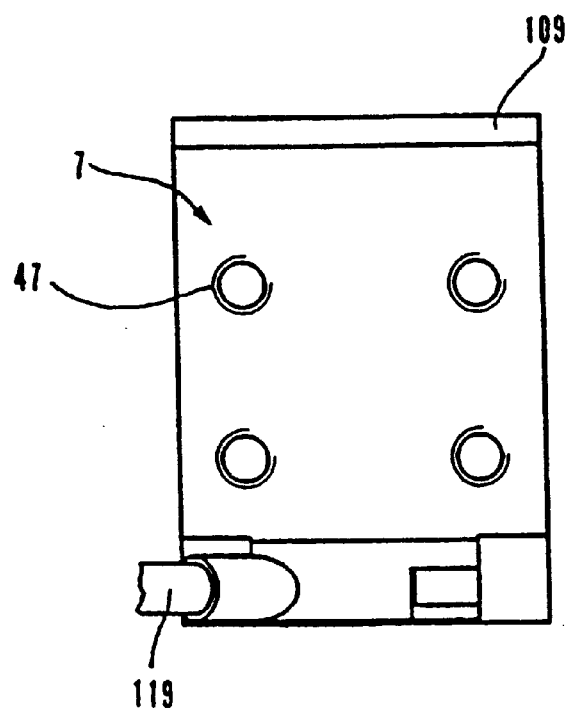
FIG. 7 is a rear view of the head of FIG. 2, when viewed in the direction of arrow VII.

Block 81 is coupled to the third portion 55 of arm 49 by means of two screws 84 (FIG. 3), while block 83 is coupled to an inner surface of casing 1 in correspondence of face 13, by means of two other screws 86 (FIG. 5).

Fulcrum 74 enables arm 49 to perform limited but accurate rotational displacements about an axis perpendicular to the longitudinal geometrical axis of casing 1 and parallel to the upper and lower faces 11 and 13, respectively. These displacements are limited by mechanical limiting devices obtained, for example, in the manner hereinafter described. A screw 85 (FIGS. 2 and 3), passing through a hole —not shown in the figures— of arm 49 is screwed into casing 1 at a reentering part of casing 1. The abutment of the portion 51 of arm 49 against the head of screw 85 limits the upward rotation of arm 49 (in FIG. 2 in a counterclockwise direction). The abutment of a dowel 91 (FIG. 3) —screwed into the threaded hole 70 in arm 49 at the first portion 51— against casing 1, at a surface 87, limits the downward rotation of arm 49 (in a clockwise direction in FIG. 2). A biasing device for urging feeler 67 against the surface of a mechanical piece to be checked comprises a return spring 95, inserted in seat 19 and having an end coupled to a cover 94 and the other end coupled to an adjustable dowel 97 screwed into hole 71. Cover 94 is pulled by return spring 95 against a recess of seat 19 for sealing seat 19. The coupling between spring 95 and dowel 97 includes an idle pin 96, coupled to dowel 97, for setting the tractive force of the spring 95 (as hereinafter more detailedly described) and preventing it from twisting. This return spring 95 applies to arm 49 a moment of rotation in a clockwise direction, in order to keep the feeler 67 urged against a mechanical piece to be checked.

A pneumatically-operated retraction device to bring the arm 49 to a definite inoperative position is made as follows. In seat 17 there is located a cylinder 98. A piston 100 can slide inside cylinder 98 and comprises two circular seats 99 for housing gaskets and an end portion for traversing arm 49 through slot 76 and contacting plate 73. A compression spring 101 has its ends coupled to piston 100 and casing 1, respectively. A cover 102 is fixed to casing 1 by an elastic ring 103, partially housed in a recess of seat 17, and seals seat 17. Cover 102 has an opening for the connection with a tube 93 for the inlet of air coming from a known pneumatic circuit including a source 92 of compressed air.

A similar retraction device may be connected to a known hydraulic circuit to be hydraulically operated.

A differential transducer of the inductive type comprises windings 105 and a core 107 made of ferromagnetic material. The windings 105 are coupled to casing 1 inside seat 21. A stem 104 is screwed to arm 49 in threaded hole 68 and inserted in seat 21 of casing 1. Core 107 is coupled to an end of stem 104 so as to be arranged within windings 105 and accomplish (with stem 104) limited displacements, substantially translations, when arm 49 displaces.

A cover 116 is coupled to face 13 of casing 1 by means of screws and has an opening (not shown in the figures) for the passage of a cable 119 (FIG. 5) carrying the electric wires connected to the windings 105 of the transducer.

A cover 109 with three holes 111, 113 and 115 is coupled to face 11 of casing 1 by means of screws placed in threaded holes 23.

Hole 111 provides access to screw 85 for setting the limit stop of the upper stroke of arm 49. In fact, by screwing or unscrewing screw 85 it is possible to lower or raise the head of screw 85, that, as previously described, represents the upper limit stop to the rotational displacement of arm 49.

Hole 113 provides access to dowel 91 for setting the limit stop of the lower stroke of arm 49. In fact, by rotating the dowel in one or in the opposite direction, it is possible to make the other end of dowel 91 move away from or approach to the surface 87 of casing 1 and, hence, vary the stroke that arm 49 performs before dowel 91 touches the surface 87 of casing 1.

Hole 115 provides access to dowel 97 for setting the tractive force of spring 95. In fact, by operating dowel 97, by virtue of the presence of the idle pin 96, that translates without rotating, it is possible to lengthen or shorten spring 95 without twisting it, and thus set the tractive force that spring 95 applies to arm 49.

A toroidal-shaped gasket 117 (or "o-ring") is placed between cover 109 and casing 1 partially housed in a groove of cover 109. A first flexible, sealing gasket 137 —with a tubular shape— has an end coupled to arm 49, at groove 61, and the other end coupled to casing 1 at a groove 140 defined in the circular opening 43. A second flexible, sealing gasket 139 has an end coupled to arm 49, at groove 63, and the other end coupled to casing 1 at groove 140. A spacer 141 is housed in groove 140 and separates the ends of the two gaskets 137 and 139. The first gasket 137, made of rubber, has the purpose of protecting the inside of casing 1 from any foreign matter that could affect the performance of the transducer, while the second gasket 139, made of rubber calendered into fabric, has the purpose of protecting the first gasket 137 from possible swarf, that could damage it.

A cover 143 is coupled to face 3 by means of four screws placed in the threaded holes 46.

The four holes 47 on face —7 are provided for securing the head to a support (that is not shown in the figures), whereto there can be coupled a second head in the event that, owing to the type of checking operation to be performed, there is the need to utilize two gauging heads. The gauging head operates in the following way.

Before moving the head and a workpiece to be checked towards each other in a known way, in order to prevent the feeler 67 from impacting against the workpiece or other obstacles during such movement, the arm 49 is brought to a definite inoperative position in which the feeler 67 is far from the checking position. To this end, the retraction device is activated by making air, coming from source 92, flow inside through tube 93. The pressure that the air applies to the piston 100 urges it to displace upwards, against the bias of spring 101, until it, through slot 76, abuts upon plate 73 and thrusts arm 49 to move in counterclockwise direction (with reference to FIG. 2) until the first portion 51 comes to abutment against the head of screw 85, so defining the inoperative position of arm 49.

When a workpiece is placed in the checking position, the retraction device is de-energized, by cutting off the air flow and spring 101 draws the piston 100 back down. At this moment of time, the tractive force, that spring 95 applies to arm 49, urges the feeler 67 to contact the workpiece to be checked.

Depending on the position that feeler 67 and consequently arm 49 undertake, stem 104 takes a specific corresponding position in seat 21 and, therefore, core 107 takes a corresponding specific position with respect to the windings 105 of the transducer. The electric signals provided by the transducer, responsive to the mutual position of core 107 and windings 105 and, consequently, to the position taken by feeler 67 with respect to a previously set zero position, are sent, through cable 119, to a storing and processing unit, not shown in the figures, that compares the measurement values with previously memorized nominal values. This storing and processing unit can be connected to the numerical control of the machine tool for the machine feedback.

Figure 9:
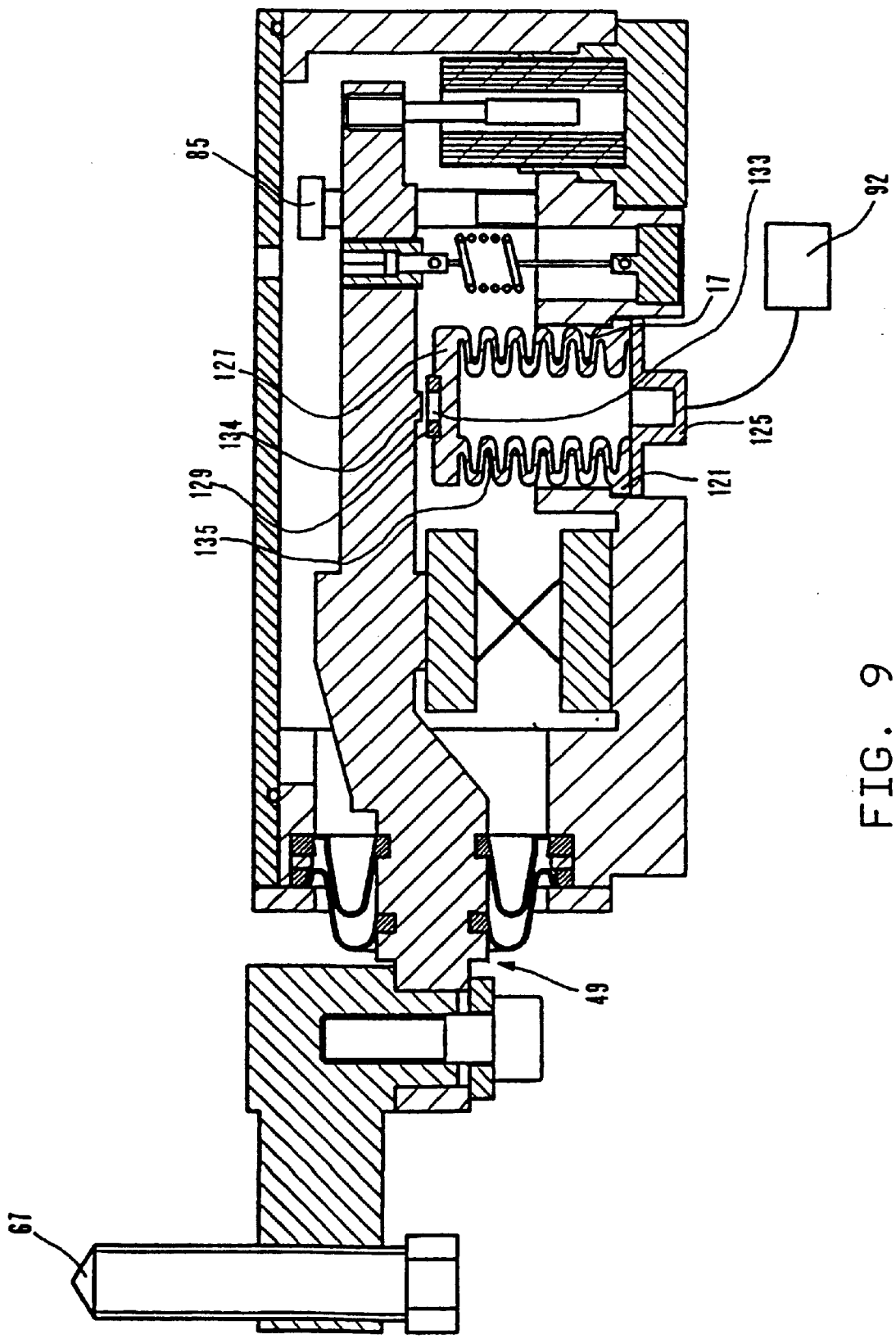
FIG. 9 is a longitudinal cross-sectional view of a head according to a second embodiment of the invention.

FIG. 9 shows a head substantially similar to the head of FIGS. 1–7, but including a different retraction device comprising a bellows 121, inserted in seat 17. Bellows 121 is made of plastic material, for example polyurethane, but it may also be made of rubber or of metal.

An end of bellows 121 is clamped in a recess of seat 17 by a flange 125. Flange 125 is fixed, for example screwed, to seat 17, in a known way, not shown in FIG. 9. The clamping of bellows 121 by flange 125 seals seat 17.

The opposite end of bellows 121 has a closing portion 127 carrying an abutment annular element 129 that is fixed (e. g. glued) at a central zone of a free surface thereof. Annular element 129 has a cylindrical seat 133 for a corresponding protruding cylindrical element 134 integral with arm 49.

Flange 125 has a through hole connected to conduits of a known pneumatic circuit including a source 92 of compressed air.

A return spring 135 is inserted in the folds of the external surface of the bellows 121.

The retraction device is activated by making compressed air flow inside bellows 121 through the hole in flange 125. The pressure applied by the air cause the bellows 121 to elongate, in opposition to the tractive force of return spring 135, until annular element 129 engages cylindrical element 134 at cylindrical seat 133. The thrust that bellows 121 applies to arm 49 urges arm 49 to abut against the head of screw 85. In this way feeler 67 is moved away from the checking position and an inoperative position of arm 49 is defined.

When a workpiece is placed in the checking position, the retraction device is de-energized, by cutting off the air flow and the bellows 121 is compressed by return spring 135. The air present in bellows 121 flows back in the pneumatic circuit, through the hole in flange 125.

If bellows 121 is made of metal, it may be fixed, for example glued, to flange 125 and an "o-ring" is used to seal seat 17.

The return spring 135 may have different shape and/or arrangement with respect to what is shown in FIG. 9, for example it may be arranged in the folds inside the bellows, or may have coils with smaller diameter and be centrally arranged within the bellows 121, spaced from the inside surface of the latter. In some cases, depending on the amount of the retraction required and on the material of which the bellows 121 is made of, the spring 135 may be omitted.

The retraction device shown in FIG. 9 has a particularly simple and economic construction, and guarantees substantially friction free operations that increase the accuracy and overall realiability of the head.

The head according to the invention can be utilized for the "in-process" dimension checking of mechanical pieces, in other terms, in the course of the machining of pieces in a machine tool (for example, a grinding machine), but also in different applications, for example for "post-process" checkings of pieces, after machining.

The herein provided description and illustrations of a gauging head may also apply —substantially without any modifications— to a head performing absolute measurements. The recess 15 in casing 1 can be filled with oil for ensuring the necessary damping effect on the movements of arm 49 in the event, for example, that it is required to utilize the head for checking grooved pieces. A proper damping effect is in particular obtained by the cooperation of the tapered-shaped end portion 51 of arm 49 with the filling oil.

The fulcrum utilized in the head according to the present invention, that consists of the deformable element 74, has a particularly simple, compact and inexpensive structure. Apart from guaranteeing utmost accurate displacements of arm 49, fulcrum 74 allows extremely simple and rapid coupling to the reciprocally movable parts (arm 49 and casing 1).

The manufacturing aspects of the deformable element 74 can differ with respect to what has been herein illustrated and described. For example, the number of laminae can be reduced to two (for example, laminae 75 and 77, shown in FIG. 8). Moreover, one of the two laminae can have a different shape: more specifically, there can be foreseen an embodiment wherein the two coplanar laminae 75 and 79 are replaced by a single lamina with a central opening for the passage of lamina 77. Even the arrangement of the laminae can differ, since the reciprocal angular position and the arrangement with respect to blocks 81 and 83 can vary. In specific applications, there can be foreseen a fulcrum comprising two reciprocally parallel laminae permanently coupled to blocks 81 and 83.

An advantage offered by the herein illustrated and described head also consists in its specific compactness, by virtue of the absence of intermediate supports and the coupling of the components (fulcrum, return spring, elements of the transducer and limiting devices) directly to casing 1. The possibility of reducing to a minimum the layout dimensions of the head is particularly advantageous in the case of "in-process" applications, where the space available is often limited.

There can be aspects of a (gauging or measuring) head according to the invention that differ with respect to what has been herein described and illustrated. For example, the retraction can be implemented in a different way: by hydraulic or electromagnetic devices or by other pneumatic devices. There can be utilized even a different type of transducer with respect to the one herein illustrated and described, and the biasing and mechanical limit stop devices can be implemented and/or arranged in another way.

What is claimed is:

1. A head for the linear dimension checking of mechanical pieces including
   a support element (1) that defines a longitudinal geometrical axis,
   a movable armset with an arm (49), movable with respect to said support element (1), and a feeler (67) coupled to said arm (49),
   a fulcrum (74) coupled to said arm (49) and said support element (1), for defining a rotation axis and enabling limited rotational displacements of said arm (49) about said rotation axis with respect to said support element (1), and
   a transducer (105,107), coupled to said arm (49) and said support element (1), for providing signals depending on the position of said arm (49) with respect to said support element (1),
   characterized in that said fulcrum (74) comprises a deformable element with two blocks (81,83) respectively coupled to said arm (49) and said support element (1) and arranged substantially parallel with respect to each other, the deformable element comprising a first lamina (75) and at least a second lamina (77), each of said first (75) and second (77) lamina being permanently secured to both blocks (81,83) angularly arranged with respect to both said blocks (81,83) and the other of said first (75) and second (77) lamina.

2. The head according to claim 1, wherein said first (75) and second (77) lamina are made of a material that differs from that of said blocks (81,83).

3. The head according to claim 1, including a third lamina (79) permanently secured to both said blocks (81,83) and substantially coplanar to one of said first (75) and second (77) lamina.

4. The head according to claim 3, wherein said first (75), second (77) and third (79) laminae are permanently secured to said blocks (81,83) by die-casting.

5. The head according to claim 4, wherein said first (75), second (77) and third (79) laminae are made of steel and said blocks (81,83) are made of zinc alloy.

6. The head according to claim 1, wherein said support element (1) defines a substantially cylindrical seat (21), and said transducer comprises windings (105) housed in said seat (21), and a core (107) coupled to and movable with said arm (49).

7. The head according to claim 1, including a biasing device located between said arm (49) and said support element (1) and comprising a return spring (95) coupled to said arm (49) and said support element (1).

8. The head according to claim 7, including a device for setting the biasing force of said return spring (95).

9. The head according to claim 1, including two limit stop devices for limiting the displacements of said movable arm (49) in opposite directions.

10. The head according to claim 9, wherein said limit stop devices comprise a screw (85) screwed to said support element (1) for cooperating with said arm (49), and a dowel (91) coupled to said arm (49) for cooperating with said support element (1).

11. The head according to claim 10, comprising devices for setting said limit stop devices (85,91).

12. The head according to claim 1, including a retraction device (98,100,101) for retracting said movable arm to a definite inoperative position.

13. The head according to claim 12, wherein said retraction device includes a pneumatic circuit with a source (92) of compressed air.

14. The head according to claim 13, wherein said retraction device comprises a cylinder (98), a piston (100) and a compression spring (101).

15. The head according to claim 13, wherein said retraction device comprises a bellows (121) having an end fixed to the support element (1) and an opposite free end adapted to cooperate with the movable arm (49) to urge it to said definite inoperative position.

16. The head according to claim 15, wherein said bellows (121) is connected to said pneumatic circuit and is adapted to elongate to bring said free end to cooperate with the movable arm (49).

17. The head according to claim 16, wherein said retraction device further comprises a return spring (135) connected to said bellows (121) and adapted to apply a compression thrust to it.

18. The head according to claim 17, wherein said return spring (135) is inserted in the folds of the external surface of the bellows (121).

19. The head according to claim 15, wherein the bellows (121) is made of plastic.

20. The head according to claim 19, wherein the bellows (121) is made of polyurethan.

21. The head according to claim 15, wherein the bellows (121) is made of metal.

22. The head according to claim 15, wherein the bellows (121) is made of rubber.

23. A head for the linear dimension checking of mechanical pieces including
   a support element (1) that defines a longitudinal geometrical axis,
   a movable armset with an arm (49), movable with respect to said support element (1), and a feeler (67) coupled to said arm (49),
   a fulcrum (74) coupled to said arm (49) and said support element (1), for enabling limited rotational displacements of said arm (49) with respect to said support element (1),
   a retraction device (121) coupled to said support element (1) and adapted to cooperate with the movable arm (49) for bringing the arm (49) to a definite inoperative position, and
   a transducer (105,107), coupled to said arm (49) and said support element (1), for providing signals depending on the position of said arm (49) with respect to said support element (1),
   characterized in that said retraction device comprises a bellows (121) having an end fixed to the support element (1) and an opposite free end adapted to cooperate with the movable arm (49) to urge it to said definite inoperative position.

24. The head according to claim 23, wherein said retraction device includes a pneumatic circuit with a source (93) of compressed air.

25. The head according to claim 24, wherein said bellows (121) is connected to said pneumatic circuit and is adapted to elongate to bring said free end to cooperate with the movable arm (49).

26. The head according to claim 25, wherein said retraction device further comprises a return spring (135) connected to said bellows (121) and adapted to apply a compression thrust to it.

27. The head according to claim 26, wherein said return spring (135) is inserted in the folds of the external surface of the bellows (121).

28. The head according to claim 23, wherein the bellows (121) is made of plastic.

29. The head according to claim 28, wherein the bellows (121) is made of polyurethan.

30. The head according to claim 23, wherein the bellows (121) is made of metal.

31. The head according to claim 23, wherein the bellows (121) is made of rubber.

32. A process for manufacturing a fulcrum (74) to be utilized in a head for the dimension checking, comprising the following steps:

provding at least two laminae (75,77) made of a first material, obtaining two blocks (81,83) made of a second material, and permanently securing said laminae (75,77) to said blocks (81,83) for achieving a single deformable element, wherein the laminae (75,77) are angularly arranged with respect to each other and to said blocks (81,83), and the blocks (81,83) are arranged substantially parallel with respect to each other.

33. The process according to claim 32, wherein the step of permanently securing said laminae (75,77) to said blocks (81,83) comprises a die-casting process.

34. The process according to claim 33, wherein said at least two laminae (75,77) are inserted in a die, and both the steps of obtaining said two blocks (81,83) and permanently securing the laminae (75,77) to the blocks (81,83) include melting said second material and injecting the melted second material in said die.

35. The process according to claim 32, wherein said laminae (75, 77) are made of steel and said blocks (81,83) are made of zinc alloy.

36. The process according to claim 32, wherein the step of permanently securing said laminae (77,78) to said blocks (81,83) comprises a welding process.

* * * * *

UNITED STATES PATENT AND TRADEMARK OFFICE
CERTIFICATE OF CORRECTION

PATENT NO.    : 6,269,546 B1
DATED         : September 4, 2001
INVENTOR(S)   : Luciano Ventura It is certified that error appears in the above-identified patent and that said Letters Patent is hereby corrected as shown below:

<u>Title page,</u>
PCT filing date is Oct. 30, 1997, but should be Oct. 31, 1997.
PCT No. is, PCT/EP97/08031, but should be PCT/EP97/06031.

Signed and Sealed this

Twenty-sixth Day of February, 2002

Attest:

Attesting Officer

JAMES E. ROGAN
Director of the United States Patent and Trademark Office